United States Patent
Seay

(10) Patent No.: US 10,019,519 B2
(45) Date of Patent: Jul. 10, 2018

(54) METHODS AND SYSTEMS FOR UTILIZING GLOBAL ENTITIES IN SOFTWARE APPLICATIONS

(71) Applicant: Gordon E. Seay, San Diego, CA (US)

(72) Inventor: Gordon E. Seay, San Diego, CA (US)

(*) Notice: Subject to any disclaimer, the term of this patent is extended or adjusted under 35 U.S.C. 154(b) by 460 days.

(21) Appl. No.: 14/066,695

(22) Filed: Oct. 30, 2013

(65) Prior Publication Data
US 2015/0120650 A1    Apr. 30, 2015

(51) Int. Cl.
G06F 17/30    (2006.01)
G06F 3/0484    (2013.01)
H04L 29/08    (2006.01)

(52) U.S. Cl.
CPC .... *G06F 17/30864* (2013.01); *G06F 3/04842* (2013.01); *G06F 17/30575* (2013.01); *H04L 67/1097* (2013.01)

(58) Field of Classification Search
CPC ......... G06F 17/30575; G06F 17/30864; G06F 3/04842; H04L 67/1097; H04L 43/50; H04L 43/0852; H04L 67/18; H04L 67/38; H04L 61/2015; H04L 61/2038; H04L 61/6022; H04L 67/42; H04L 67/10; H04L 29/06027; H04L 43/022; H04L 43/04; G06Q 10/083
See application file for complete search history.

(56) References Cited

U.S. PATENT DOCUMENTS

| | | | |
|---|---|---|---|
| 2003/0195780 A1* | 10/2003 | Arora | G06Q 10/06 705/35 |
| 2004/0031030 A1* | 2/2004 | Kidder | G06F 1/14 717/172 |
| 2004/0049523 A1* | 3/2004 | Macholda | G06Q 30/06 707/E17.014 |
| 2004/0225629 A1* | 11/2004 | Eder | G06N 5/022 706/46 |

(Continued)

OTHER PUBLICATIONS

Paolo Bouquet and Andrea Molinari—"A global Entity Name System (ENS) for data ecosystems"—The 39th International Conference on Very Large Data Bases,—Aug. 26th-30th, 2013, Riva del Garda, Trento, Italy.—Proceedings of the VLDB Endowment, vol. 6, No. 11—pp. 1182-1183.*

(Continued)

*Primary Examiner* — Anh Ly

(57) ABSTRACT

Disclosed are methods and systems to utilize entities from global collections in software applications. An example method comprises providing an application to receive a search request for entities within a global collection, displaying retrieved records, receiving user input including a selected entity, and copying data from a selected entity into a non-global collection of data. Another method comprises displaying a pictorial graphic depicting a business card, and synchronizing the graphical elements with a global entity record. Examples of systems generally comprise a data storage, a server, a first application configured to receive first user input and insert user input into a global collection of (Continued)

entities, a second application configured to display data associated with at least one entity record from a global collection of entity records, receive second user input, and copy data associated with a selected global entity record to a non-global collection of entities.

29 Claims, 8 Drawing Sheets

(56) References Cited

U.S. PATENT DOCUMENTS

| | | | | |
|---|---|---|---|---|
| 2006/0271391 A1* | 11/2006 | Lee | ............... | G06Q 30/02 |
| | | | | 705/1.1 |
| 2007/0041583 A1* | 2/2007 | Boneh | ............... | H04L 9/0847 |
| | | | | 380/28 |
| 2007/0180086 A1* | 8/2007 | Fang | ............... | H04L 41/0213 |
| | | | | 709/223 |
| 2008/0120129 A1* | 5/2008 | Seubert | ............... | G06Q 10/06 |
| | | | | 705/35 |
| 2008/0243912 A1* | 10/2008 | Azvine | ............... | G06Q 10/06 |
| | | | | 707/E17.014 |
| 2008/0307486 A1* | 12/2008 | Ellison | ............... | H04L 63/102 |
| | | | | 726/1 |
| 2009/0034714 A9* | 2/2009 | Boneh | ............... | H04L 9/0847 |
| | | | | 380/28 |
| 2009/0254971 A1* | 10/2009 | Herz | ............... | G06Q 10/10 |
| | | | | 726/1 |
| 2010/0241671 A1* | 9/2010 | Bosman | ............... | G06Q 10/10 |
| | | | | 707/805 |
| 2011/0110515 A1* | 5/2011 | Tidwell | ............... | H04N 21/23109 |
| | | | | 380/200 |
| 2011/0170788 A1* | 7/2011 | Nepomniachtchi | ............... | G06K 9/00463 |
| | | | | 382/229 |
| 2011/0185137 A1* | 7/2011 | Nielsen | ............... | G06F 3/0613 |
| | | | | 711/162 |
| 2011/0307299 A1* | 12/2011 | Brignull | ............... | G06Q 30/02 |
| | | | | 705/7.33 |
| 2012/0144129 A1* | 6/2012 | McKenney | ............... | G06F 9/526 |
| | | | | 711/152 |
| 2013/0346229 A1* | 12/2013 | Martin | ............... | G06Q 40/00 |
| | | | | 705/26.3 |
| 2014/0173232 A1* | 6/2014 | Reohr | ............... | G06F 3/0611 |
| | | | | 711/162 |
| 2014/0337436 A1* | 11/2014 | Hoagland | ............... | H04L 51/16 |
| | | | | 709/204 |

OTHER PUBLICATIONS

Geoffrey M. Voelker et al.—"Implementing Cooperative Prefetching and Caching in a Globally-Managed Memory System"—Published in: Proceeding SIGMETRICS '98/Performance '98 Proceedings of the 1998 ACM SIGMETRICS joint international conference on Measurement and modeling of computer systems vol. 26 Issue 1, Jun. 1998—pp. 33-43.*

* cited by examiner

700 http://application.publisher.com — 705

Application — 710

Add Yourself — 715

Add Yourself

First Name: [John]    Last Name: [Smith] — 720

Company: [Fake Company Limited, LLC] — 721

[ATTACH YOUR PHOTO] — 723    [ATTACH COMPANY LOGO] — 724

Street: [1234 Main Street] — 725
City: [San Diego] — 725
State: [CA] — 725
Postal Code: [92111] — 725

Telephone: [+1 (858) 111-2222] — 725
Email: [john.smith@fakecompany.comm] — 725

[X] I understand my information will be shared with other users.
730

[SUBMIT] — 740

FIGURE 7

METHODS AND SYSTEMS FOR UTILIZING GLOBAL ENTITIES IN SOFTWARE APPLICATIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present disclosure relates generally to methods and systems for utilizing entities within user collections in software applications, such as hosted and/or network-accessible applications. In particular, methods and systems for extracting entity data from a globally-shared collection of data and inserting such data within a local or non-global user collection, and displaying entities in a beneficial graphical manner, are described.

Typical software applications enable users to add data records which are specific to that user or, in business scenarios, that user's organization. For example, a business user using a business software application may store within that application their business' customers, prospects, vendors, or other such entities. The process of storing entity data may involve typing information such as entity names, physical addresses, email addresses, and phone numbers.

Modern application delivery systems include Software-As-A-Service ("SaaS") platforms, whereby the application and the client are connected by a wide-area-network ("WAN"). Thousands or millions of distinct users of these hosted SaaS applications may connect to the same SaaS platform and application, yet they store their own individual data. Of course, software applications beyond SaaS applications exist and also utilize the benefits of modern networking.

Inevitably, data records being input and stored by one user of a widely-used platform or application may portray the same entity as inputted by another user. For example, one business user may type name, address, and phone details of a customer, and another business user, unknown to the first user, having the same customer, may also type nearly identical or identical details when inputting information about that customer.

It is inefficient, tedious, and thus problematic for a user to type information about an entity into a networked software platform when some or all of that entity information already exists within a collection of data within an accessible data storage, or when that information is available from any other data source connected to the networked software platform. Other data sources may include, for example, social media networks, business databases, consumer databases, etc.

Given the widespread use of social media networks and cloud-computing networked software applications, it is particularly troubling that data is available across networks but not exposed to users of software applications that routinely accept data input of such entities.

Furthermore, even if an application can presently group shared entities into user-collections, mere groupings of global records do not create editable records within a user collection, nor does the person grouping shared records control the data held within each record. As such, a basic intra-application grouping methodology is insufficient to address the needs of users who need to edit, preserve, and otherwise control the entity data, or who may need to use the entity data from within a different application than the application where entity data was originally entered. For example, in the case of a business user needing to maintain records of customers, the user presumably needs to edit, append, or delete data within each record, over time, and that user must have the ultimate control of whether data is modified, and that user may need to perform tasks, from within multiple applications, associated with the same customer.

Data associated with entities is often viewed in mundane textual formats. Textual representations of entity data fields, often in scattered parts of one or more user interface screens, can lead to users not seeing data fields being presented, not properly confirming data fields as accurate, and consuming more time than necessary absorbing displayed data. Textual output also does not satisfy the needs of users who may have access to graphic images, such as photos of persons or company logos. Even if textual output is accompanied by images, the lack of a suitable formatting of the output still adversely affects users.

Thus, there exists a need for methods or systems which expose global entity data records available to a software application, represent them in a visually helpful manner, and allow a user to quickly and efficiently select desired records to be used as part of a local, user-specific collection, whereby the collection of records would thereafter be controlled and editable by such user or his organization, and whereby data associated with a record could then be used by an application to perform a meaningful task. Examples of new and useful methods relevant to the needs existing in the field are discussed below.

BRIEF SUMMARY

The present disclosure is directed to methods and systems for utilizing entities within software applications. Some examples of methods include providing a networked application server, providing a data storage, providing a global collection of data, providing a non-global collection of data, providing an application from the networked application server, receiving user input to search within the global collection, retrieving at least one entity record from the global collection, receiving user input to identify a selected record from the global collection, and copying data from the global collection to insert into a non-global collection associated with the user. Another example of a method is a graphical entity utilization method, comprising displaying, on a display unit of a computer configured to execute a software application, a pictorial graphic depicting a business card.

Some examples of systems generally comprise a data storage, a server, a first application configured to receive first user input and insert user input into a global collection of entities, a second application configured to display data associated with at least one entity record from a global collection of entity records, receive second user input, and copy data associated with a selected global entity record to a non-global collection of entities.

Furthermore, use of the invention permits a cloud-computing network of global entities to be meaningfully exposed to software applications.

BRIEF DESCRIPTION OF THE DRAWINGS

FIG. 7 is a screenshot of a second example of a user interface produced by an application according to the methods and systems described herein.

DETAILED DESCRIPTION

Figure 1:
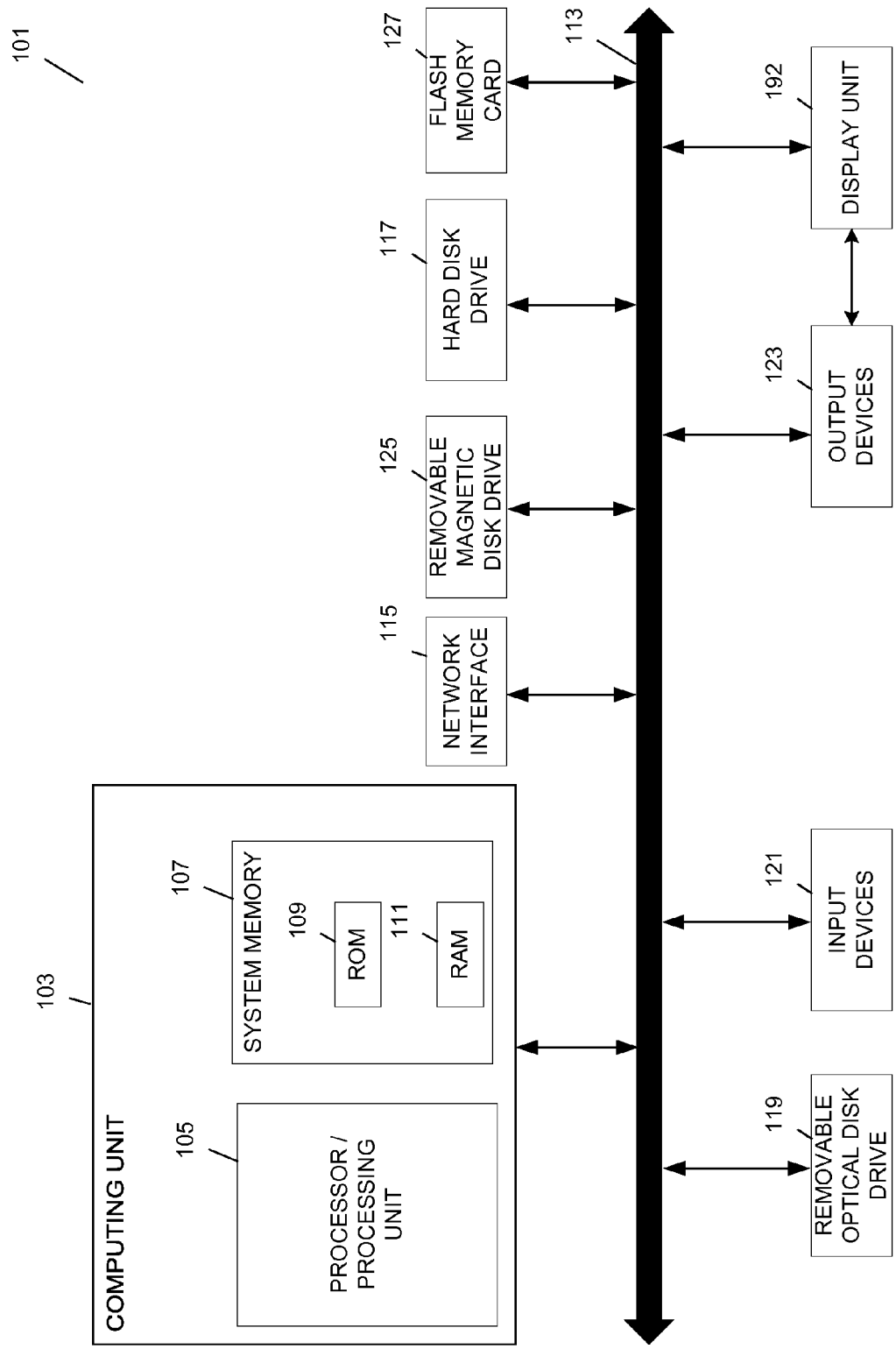
FIG. 1 shows a schematic view of an example of a programmable computing device.

The disclosed methods and systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various systems and methods are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Throughout the following detailed description, commas or periods or other symbols used in punctuation, when appearing within quoted text, may exist for grammatical purposes. A comma or period, for example, may be a meaningful part of the quoted text or it may only serve to add grammatical accuracy to the containing sentence. The reader should understand the difference based upon context.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

The following detailed description includes definitions of selected terms employed herein. The definitions include various examples and/or forms of components that fall within the scope of a term and that may be used to implement the disclosed methods. The examples are not intended to be limiting. Both singular and plural forms of terms may be within the definitions. The reader should further understand that definitions of some terms should be construed based upon context, so that industry-specific terms that also have generalized meaning in the English language shall be read with an industry-specific definition in their technical context and a general English definition outside of their intended technical context. For example, "field," per the technical definition hereafter, may refer to a unit of data in data structures, but "field" outside of data structure contexts may still be used in general English wordings herein to describe an area of open land or a field of study.

"Access a data storage," or like terminology, as used herein, includes accessing a data storage by direct or indirect means. Specifically, if a first application, or unit of code, is configured to access a data storage, it should still be deemed to access the data storage even if such is handled through a second software application, or second unit of code, with which the first application, or unit of code, communicates. For example, in client-server architectures, or mobile application architectures, an application may communicate with a data storage via communication to code operating on the server, whereby the server code communicates with the data storage and the client application or mobile application communicates with the server; in such a scenario, the application should still be deemed to have access to the data storage.

"Application," as used herein, includes but is not limited to a software program with a specific purpose. Applications may be web applications that include one or more of HTML layouts, scripts, compiled code, or other formats commonly used in hosted or client/server applications. Applications may be desktop applications. Applications may be software programs running on mobile devices. Applications may be known as "apps," such as, but not limited to, a communication app, a social media app, a messenger app or a task-specific business app, where the apps are downloaded from online stores operated typically by the publisher of an operating system, such as the Windows Store, or equivalent stores from Apple or Google or Amazon.com. Applications may be executed on clients, servers, or combinations thereof. Applications may be configured to access databases or other data references stored on servers, clients, or other network accessible computing devices. Applications may define hosted applications, hosted services, cloud computing applications, and/or additional or alternative technologies that provide software as a service (SaaS). An application may also be a hosted software program within a group of hosted applications included in a group of related applications defining a cloud software suite.

"Application server," as used herein, includes but is not limited to a computing device including a processor and configured to at least partially run one or more software applications. An application server may be configured to exclusively run or deliver to a client computing device a single software application or multiple software applications. An application server may be configured to deliver, and not execute on its own processor, computing code associated with a software application to a client computer or client computing device. In such situations, the client computing device may partially or fully execute the application code and the application server may execute only a partial portion or no application code. An application server may be a software framework instead of a dedicated computing device, where the software framework serves to execute computing code and/or deliver computing code to a client computing device. An application server may be a web server configured to serve applications. An application server may be a delivery framework to allow download of software applications to mobile and desktop operating systems. In such instances, thereafter download, the application may not utilize or communicate with the delivery framework for purposes of using the application. Types of application servers or application server frameworks are numerous and include, but are not limited to, Java application servers, Microsoft application servers, PHP application servers, and custom-created application servers or application server frameworks. An application server may even be an online store operated typically by the publisher of an operating system, such as the Windows Store, or equivalent stores from Apple or Google or Amazon.com.

"Client computer," as used herein includes but is not limited to a computer or other electronic device configured to run software applications. A client computer may be a computing device with a processor partially or fully executing software instructions. For example, the client computer may be a desktop computer, a laptop computer, a mobile electronic device, such as a smartphone, a personal data assistant, or a tablet computer. The client computer may be any currently known or later developed computing device.

"Collection," as used herein, includes but is not limited to, a database, a database table, a set of records within a table or database, a list of items or entities, an array of items or entities, computer-formed dictionaries or any other grouping of data records or common variations of data collections.

"Data storage," as used herein, refers to a physical and/or logical entity that can store data. Data storage may be, for example, a computer containing a database, or simply a database, a table, a file, a list, a queue, a heap, a memory, a register, a file directory, a storage location, and so on. Data storage may reside in one logical and/or physical entity and/or may be distributed between two or more logical and/or physical entities. Data storage may be any currently known or later developed means for storing data in a computing environment, including memory local to an application server or remote memory in communication with the application server.

"Entity," as used herein, includes but is not limited to, an organization, business, individual human contact of a business, person, customer, vendor, employee, contractor, associate, worker or any type of legal entity commonly a party to a business or legal transaction. The term "entities," as used herein, refers to the plural of "entity."

"Field," as used herein, within the context of data, data elements or data structure, includes but is not limited to, a data unit, commonly as a unit of a data record. For example, a field may be a person's first name or a company name or even an ID, stored as a unit of a record of data. Depending upon the context, the use of the term could refer to the data structure or the value within the structure, although usually the term "field" refers to the data value itself. For example, when referring to copying fields, the context would suggest the copying of the values within the fields. However, when referring to a schema of fields within a record within a table within a database, the context would suggest that fields refers to the structural component.

"Global collection," as used herein, includes but is not limited to, a plurality of global entities accessible to a plurality of users of at least one software application. Although a global collection could be accessible to all users of an application, it is possible that a global collection would be accessible to a subset of all users. It is also possible that a plurality of global collections may exist and be accessible to users of one or more applications.

"Global entity," as used herein, refers to an entity whose data is available outside of a single user's information space, or the information space allocated to a user's organization. The term doesn't require that the entity data is available to the public or to all users, as the entity data may be accessible to users on a private system, a private network, a private application, or other private segment.

"Non-global collection," as used herein, includes but is not limited to, a plurality of non-global entities combined into a group. A non-global collection is typically grouped by way of associating a collection framework or their entity members with at least one user, directly or indirectly. An example of an indirect association between a user and a non-global collection could be where a non-global collection is associated with an organization, and an organization is then separately associated with a user who works for that organization. A non-global collection may contain entities which exist in the global collection or which do not exist in the global collection. An entity contained within a non-global collection could be added by the act of a user selecting the entity from a global collection or by other means, such as manual entry by a user of the entity data.

"Non-global entity," as used herein, refers to an entity whose data is not available outside of a single user's information space, or the information space allocated to a user's organization.

"Providing" and "Provide" as used herein, includes but is not limited to direct action to provide by a party as well as indirect action through another party, such as having another party provide the indicated good, hardware, software, data storage, database, entity, service, etc. Particularly in instances of indirect provision, the reader should understand that the terms "providing" and "provide" may have a meaning more synonymous with "utilize".

"Record," as used herein, within the context of data structure, includes but is not limited to, a group of one or more data fields. For example, a record may contain fields which, together, describe an entity, such as a customer.

The term "software," as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servlet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

"User," as used herein, includes but is not limited to, a person, computer, device, entity or software which interacts with or uses a software application, including use by proxy. A user may be an individual acting on behalf of an entity, such as a person performing work for a company, or a user may be considered as the entity itself, such as the company.

"User interface," as used herein includes but is not limited to the visual part of a software application through which a user interacts with the software application. A user interface may include an interface object or a series of objects displayed on a display unit. For example, a user interface may represent a group of elements such as a menu bar, a table or other data list, selection controls, and a submit button. A user interface may be display within a web browser or a user interface may be deemed to include the web browser itself.

Accordingly, FIG. 1 shows one illustrative example of a computer 101 that can be used to implement various embodiments of the invention. Computer 101 may, for example, be a server, such as an application server or a database server. Computer 101 may, for example, be a client computer with a display, configured to execute a web browser. Computer 101 may, for example, be a mobile device. Computer 101 may, for example, be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick), a scanner, a camera or a microphone. Output devices 123 may include, for example, a display unit 192, such as a monitor display, an integrated display, or a television; a printer; a stereo; or speakers.

Still further, computing unit 103 will be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. A network interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player or iOS or Android based smartphone. As known in the art, this type of digital music player can serve as both an output device for a computer (e.g. outputting music from a sound file or pictures from an image file) and a storage device.

In addition to a digital music player, computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smartphones, tablet computers, or portable music players, often operating the iOS, Symbian, Windows-based (including Windows Mobile, Windows Phone, or Windows RT), or Android operating systems.

Figure 2:
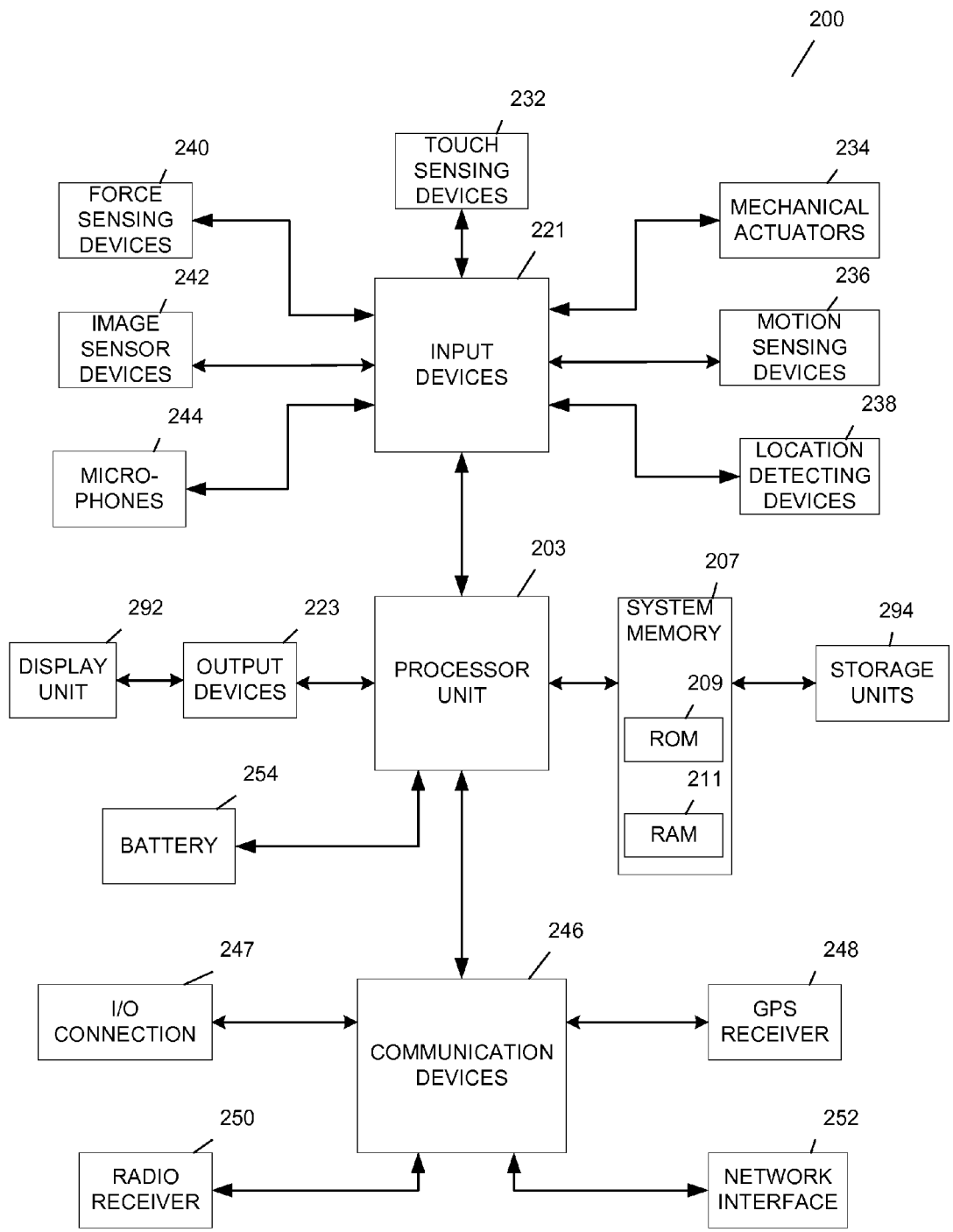
FIG. 2 shows a schematic view of an example of a mobile electronic device.

With reference to FIG. 2, an exemplary mobile device, mobile device 200, may include a processor unit 203 (e.g., CPU) configured to execute instructions and to carry out operations associated with the mobile device. For example, using instructions retrieved for example from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well known operating systems such iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include touch sensing devices 232 such as touch screens, touch pads and touch sensing surfaces, mechanical actuators 234 such as button or wheels or hold switches, motion sensing devices 236 such as accelerometers, location detecting devices 238 such as global positioning satellite receivers, WiFi based location detection functionality, or cellular radio based location detection functionality, force sensing devices 240 such as force sensitive displays and housings, image sensor devices 242, and microphones 244. Input devices 221 may also include a clickable display actuator.

Mobile device 200 also includes various output devices 223 that are operatively coupled to processor unit 203. Output devices 223 are configured to transfer data from mobile device 200 to the outside world. Output devices 223 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 3:
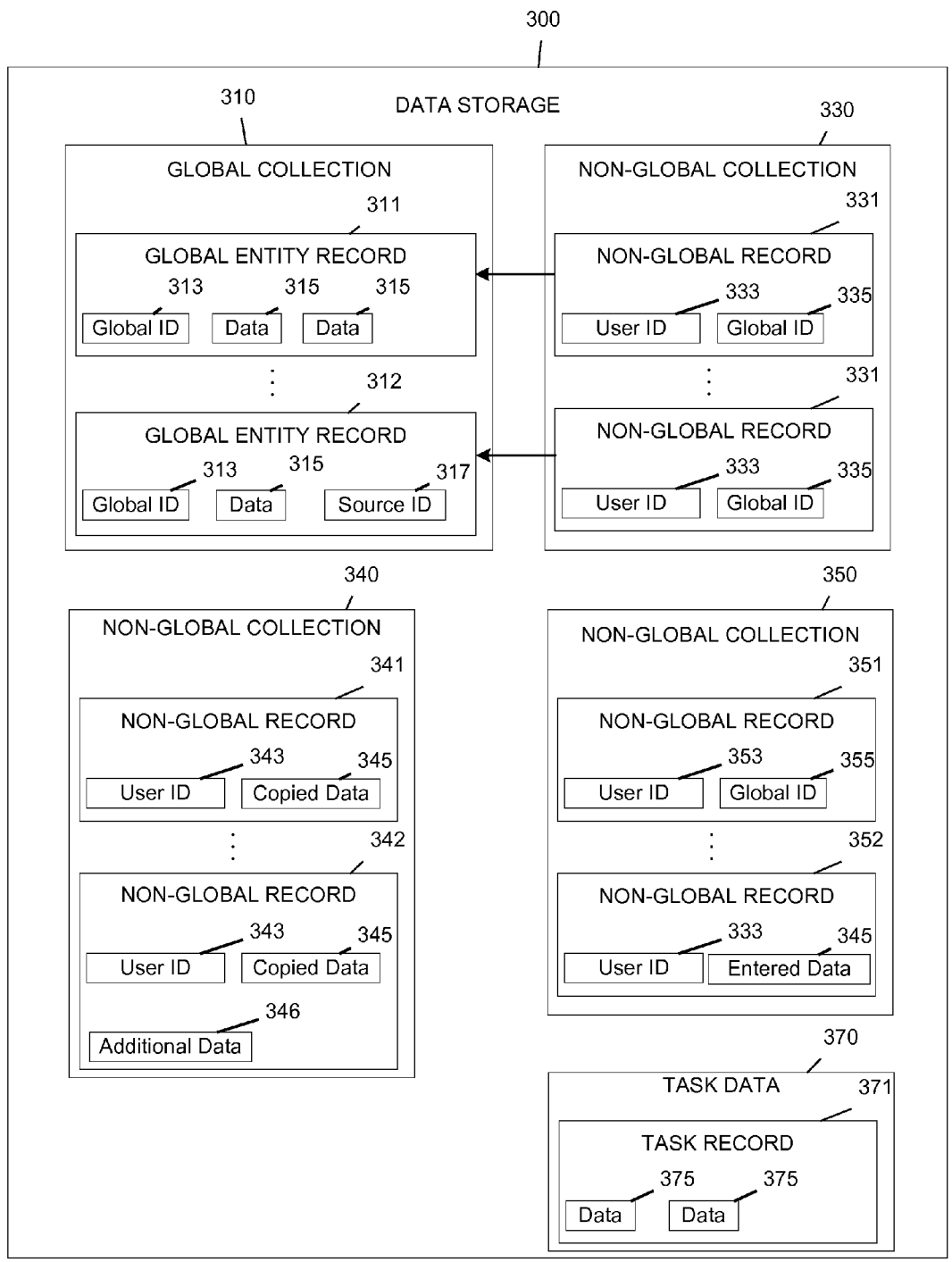
FIG. 3 shows a diagrammatic view of an example of a data storage.

FIG. 3 represents an example data storage. There are many possible types of data storages. The example data storage, data storage 300, includes a global data collection 310, and at least one non-global collection, 330 and/or 340 and/or 350.

Global collection 310 illustrates a collection of global entity records, such as example records 311 and 312. Each global entity record 311 may contain a global ID 313 as a unique global identifier value. When the data storage 300 includes or consists of a transactional database, these global IDs 313 are often, but not necessarily, referred to as primary keys. Each global entity record 311 also provides one or more data fields, such as data field 315, which primarily or entirely contain information about the particular global entity.

Some global entity records, such as example global entity record 312, may contain more than one ID. For example, global entity record 312 could contain a source ID, such as source ID 317. Source ID 317 may, for example, identify the user who contributed the global entity record 312 or the user about which the global data field(s) 315 serve to describe.

Non-global collection 330 illustrates a collection of non-global entity records, such as non-global entity records 331. Each non-global entity record 331, in this example, is identified as a member of a collection, such as non-global collection 330, by an identifier. As shown, global ID 335, within non-global record 331, if matching global ID 313, within global entity record 311, effectively signifies the global entity record 311 to be a member of the user's non-global collection 330, identified by user ID 333. User ID 333 could be a unique numeric ID, a unique alphanumeric ID, or any unique value possibly even being the user's name. The user corresponding to user ID 333 may, for example, be a user of the software application and/or perhaps an entity within the global collection of entities.

Provided that records are grouped by some identifier, in this example being user ID 333, non-global collections of entities, such as collection 330 and/or collection 340 and/or collection 350 are formed. But, it is important to understand that a user ID, such as represented in FIG. 3, is not the only type of identifier that could be employed. For example, user ID 333 could alternatively be a collection ID or company ID corresponding to a non-global collection used by many users, perhaps many users of an organization, but even in such an instance, a database architect may wish to store a user ID data field in addition to an alternative "collection ID" data field, as a means of identifying which user was responsible for storing the entity record into a non-global collection. There are many possibilities for architecting the collections within a data storage.

In non-global collection 330, the general purpose of storing global ID 335 is to avoid the duplicative method of storing copies of data field(s) 315 again within each non-global entity record 331. If the size in bytes of data field(s) 315 is significant, then space is wasted within the data storage when arguably a pointer, in this case, global ID 335 could be used to point to the same data, as represented here by data field(s) 315. Furthermore, it is a common practice of database administrators to normalize data, which refers to the process of organizing data, and often eliminating duplicate data, to minimize redundancy. There are many possible combinations or permutations when organizing data and this illustration serves only to portray an example.

In some examples, users may have the need to edit entity data within their non-global collection without the global entity records being affected. Therefore, a non-global collection, such as non-global collection 340 could be structured so that data is actually redundantly copied from one or more data fields 315 within the global entity records 311. Although redundant, it allows the user to further modify the data. In other words, some non-global records, such as non-global record 341 may store copied data 345 as a copy of or a subset of global data fields 315 in lieu of storing a global ID 335 as reflected in non-global record examples 331. This type of collection again stores a user ID, such as user ID 343, to signify the owner of the collection. This architecture allows for possible modification of copied data 345 without modifying the original global data fields 315.

In further variations of this scenario, as illustrated within non-global record 342, copied data 345 could even exist alongside additional data field(s), such as data field 346, added by the user and not copied from the global entity record 311.

In other examples, a user corresponding to user ID 353 could create a non-global collection, such as collection 350, of non-global entity records, such as records 351 and 352, where in non-global entity record 351, there is a global ID pointer, such as global ID 355, to the global entity record, from which the application could retrieve data fields, and in example non-global entity record 352, the record is shown to not originate from the global collection of entities but instead entered data 345 was input manually by the user.

Architecturally, there are numerous possible variations of such data organization techniques. For example, a non-global collection could consist of a record architected as non-global record 351 combined with a record architected as non-global record 342. Or, perhaps a record architected like non-global record 341 could exist alongside a record architected like non-global record 352. In practice, though, it is likely that a database architect may structure all non-global records with the same data layout, particularly if the application's business logic dictated, for example, that a user should always be allowed to edit entity data, or never be allowed to edit entity data, or never be allowed to add entities not originally derived from the global collection of entities, etc. It is also possible, in some architectural variations, that global entities and non-global entities could be stored in the same database table but identified with additional data fields to indicate their scope. A database architect could even have temporary tables to hold entity data before an entity provides permission to be added to a final collection. Again, there are alternate architecting methodologies which may be employed.

Referencing FIG. 3's sample architecture again, in other variations of a data storage architecture, the non-global collection 330 and/or non-global collection 340 and/or non-global collection 350 could be stored in a separate data storage from the global collection 310. Even the provider of the data storage and underlying data could be different than the provider of the application which creates non-global collections for its users. Given the prevalence of today's low latency and wide-area networks, such variations are practical. For example, a database could be exposed as the global collection in one data storage, and a Software-as-a-Service (SaaS) application could access the database across the internet or a local network, thus allowing users to quickly add entities from the database into their non-global collection held within a second data storage.

In other variations, it is possible that more than one global collection 310 would be made available to a software application, and a user could add entities to their non-global collection from any of the available global collections.

In other variations, the application may use data associated with an entity in a non-global collection to perform a task. For example, in an accounting application, the application may generate an invoice associated a customer of a user; in this example, the task is to generate an invoice and the customer may be an entity within the user's non-global collection. In such situations, it may be necessary to store additional data associated with the data. Such can be performed by adding data related to the task to the data storage.

Task data, as illustrated by sample task data 370, could be stored in the data storage 300, to address the possible need of storing additional task-related data associated with entities in a non-global collection. Task data 370 could be stored as a table in a relational database, for example. A data record, such as task record 371, could contain a row of data fields, such as data fields 375, which store specific information related to the task. In likely scenarios involving relational databases, one data field 375 could store an identifier that associates the task data record to an entity with a matching unique identifier added to a non-global, or even global, collection.

Figure 4:
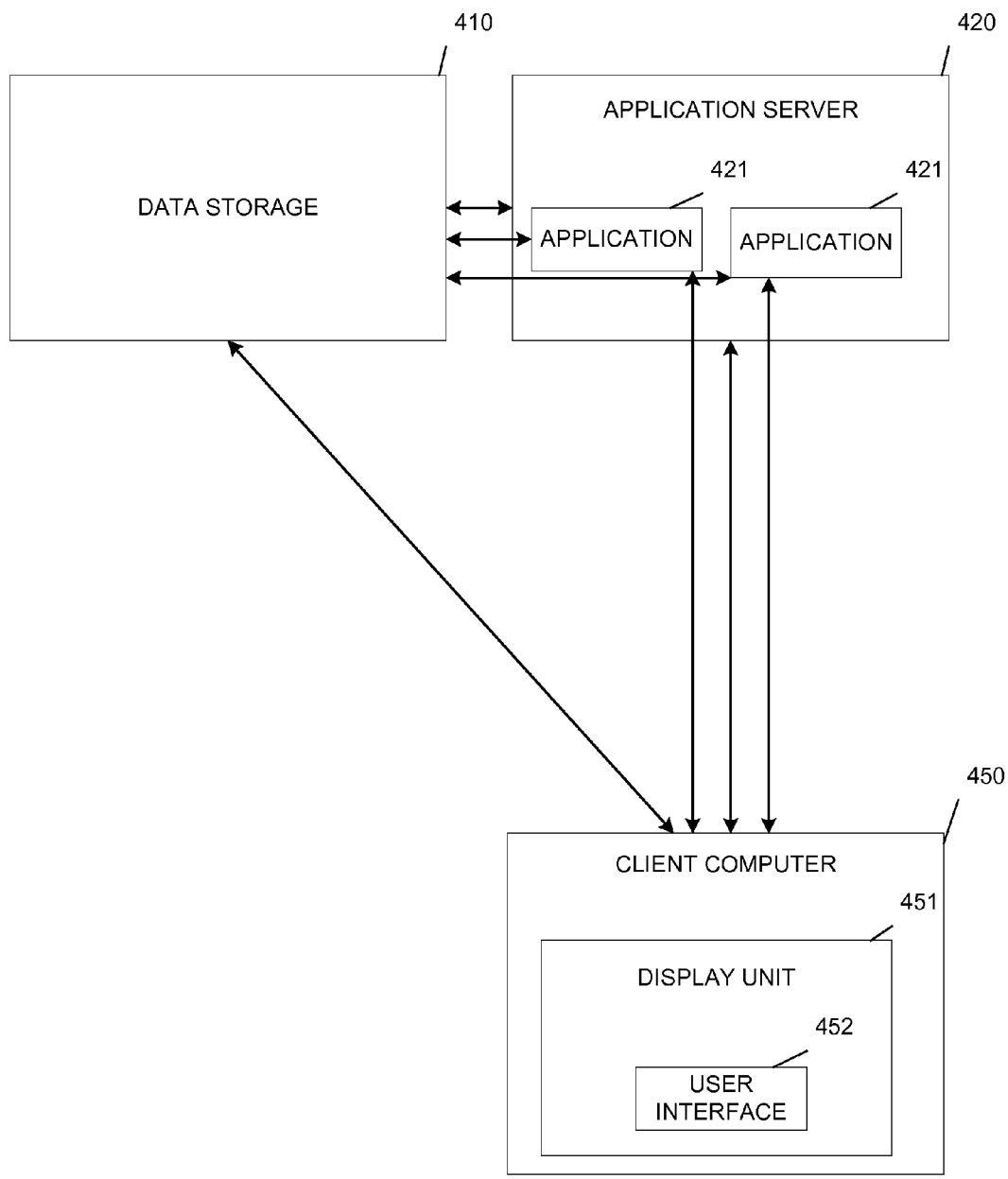
FIG. 4 shows a diagrammatic view of an example application server, an example application, an example data storage, and an example client computer.

In FIG. 4, we can see an example view of a data storage, data storage 410, operating with an example application server, application server 420, and an example client computer, client computer 450. The data storage 410 could be representative of the data storage described in FIG. 3, but here represented from a broader perspective to show its relationship with other elements in an example architecture.

A data storage, such as the data storage 410, much like other elements of the invention, in some configurations, could represent a data storage operated by the implementor or, in other configurations, represent one operated by another party and simply utilized by the implementor. Furthermore, in instances where more than one data storage is utilized, it is possible for an implementor to directly provide a data storage containing a collection and also to indirectly provide and utilize another data storage containing a collection. For example, an implementor could directly provide the data storage and a database with a non-global collection and indirectly utilize a data storage containing a global collection across the internet.

The application server 420, and/or the client computer 450, are configured to access the data storage 410 via a network connection. The network connection could be a local area network connection, or a wide-area-network connection. A wide-area-network connection could include network connectivity over a private network serving more than one geographic location or it could represent the internet, or a combination thereof. Network connections could be wired or wireless. Network communications could occur in many theoretically different ways, with any of the now-known or later known network communications models, including, for example, using the TCP/IP or HTTP protocol over Ethernet network connections.

Data communication may be structured with, for example, Extensible Markup Language (XML). XML may be used as part of a Simple Object Access Protocol (SOAP). Representational State Transfer (REST) is another possible protocol that could be used. JSON formatting of data structures to transmit data could also be used. Unlike these generally open standards for communications, closed proprietary communication methods or protocols could also be used, such as those used by Microsoft SQL Server or Oracle database technologies. Many open or closed communications protocols or structures would be suitable and the architect of the solution must choose a method appropriate for the application.

Data communication with the data storage 410 may be encrypted. Data communication may involve client/server authentication to ensure access to the data is allowed by the application server 420 or the application(s) 421 or the client computer 450.

FIG. 4 depicts an application server 420 and/or application(s) 421 and/or a client computer 450 communicating with the data storage 410. Software architecture models have grown increasingly complex and varied over time and it is feasible that data communication could occur with the data storage from a variety of software objects or locations. For example, a web server may function as an application server 420 and deliver an application 421 to a client computer 450 where the application 421 reads some data directly from the data storage 410, while other data is retrieved via the application 421, which is partially executing on the application server 420, which, in turn, communicates with the data storage 410, and returns data to the application 421 to pass back to the client computer 450. The number of applications and/or client computers could be different in various configurations.

In some variations, multiple applications are used. For example, one application 421 may communicate with a client computer 450 to perform functionality associated with a user adding a global entity to a global collection while a second and different application 421 may communicate with the same or different client computer 450 to perform functionality associated with a second user searching global entities, seeing displayed search results of global entities, selecting a global entity and clicking a button to signify to the second application that the application should copy data from the global entity to a non-global entity record within a non-global collection.

As FIG. 4 also shows, computer executable code associated with the application(s) 421 is transferred to a client computer 450.

In some examples, the computer executable code is partially, primarily, and/or wholly executed on the server side. The code may be written in languages such as C#, Java, JavaScript, PHP, or Ruby and implement server-side technologies like ASP.NET or CGI. In examples where the application server primarily executes the computer executable code, the computer executable code transferred to the client computer includes browser executable code.

The browser executable code may include plain HTML and image files providing a cloud-accessible interface allowing users to operate the applications provided by the server-side applications. In particular, examples that are partially or primarily executed on the server side may be particularly suitable for cloud computing contexts. In some examples, the server side applications can access and manipulate local state data memory, such as by including cookies in the computer executable code transferred to the client computer.

In some examples, the computer executable code is configured to be executed partially, primarily, and or wholly on a user's computer or mobile device, such as client computer 450. The code may be written in a client-side executed markup language, such as HTML, a client-side-executed scripting language like Javascript, and/or a client-side executed compiled language like Java or C#. When transferred, the computer executable code on the client computer is configured to display a user interface 452 on a display unit 451 connected to, or part of, the client computer 450.

The client computer 450 could be a desktop computer with monitor, such as one running a Windows or Mac or Linux operating system. Or, for example, the client computer 450 could be a mobile device with an integrated display unit, such as an Apple or Android phone or tablet, where such mobile devices are configured to allow execution of software application(s) 421.

The application server 420 may also be considered as a combined hardware and software vehicle that allows downloads of software application(s) 421 to client computers. Examples of such include online app stores from Apple, Google, and Microsoft. In such examples, users download application(s) 421 and the application server 420 is not likely involved in the application execution thereafter download. The application(s) 421 would likely execute wholly on the client computer 450 and the client computer 450 would communicate directly with the data storage 410.

Figure 5:
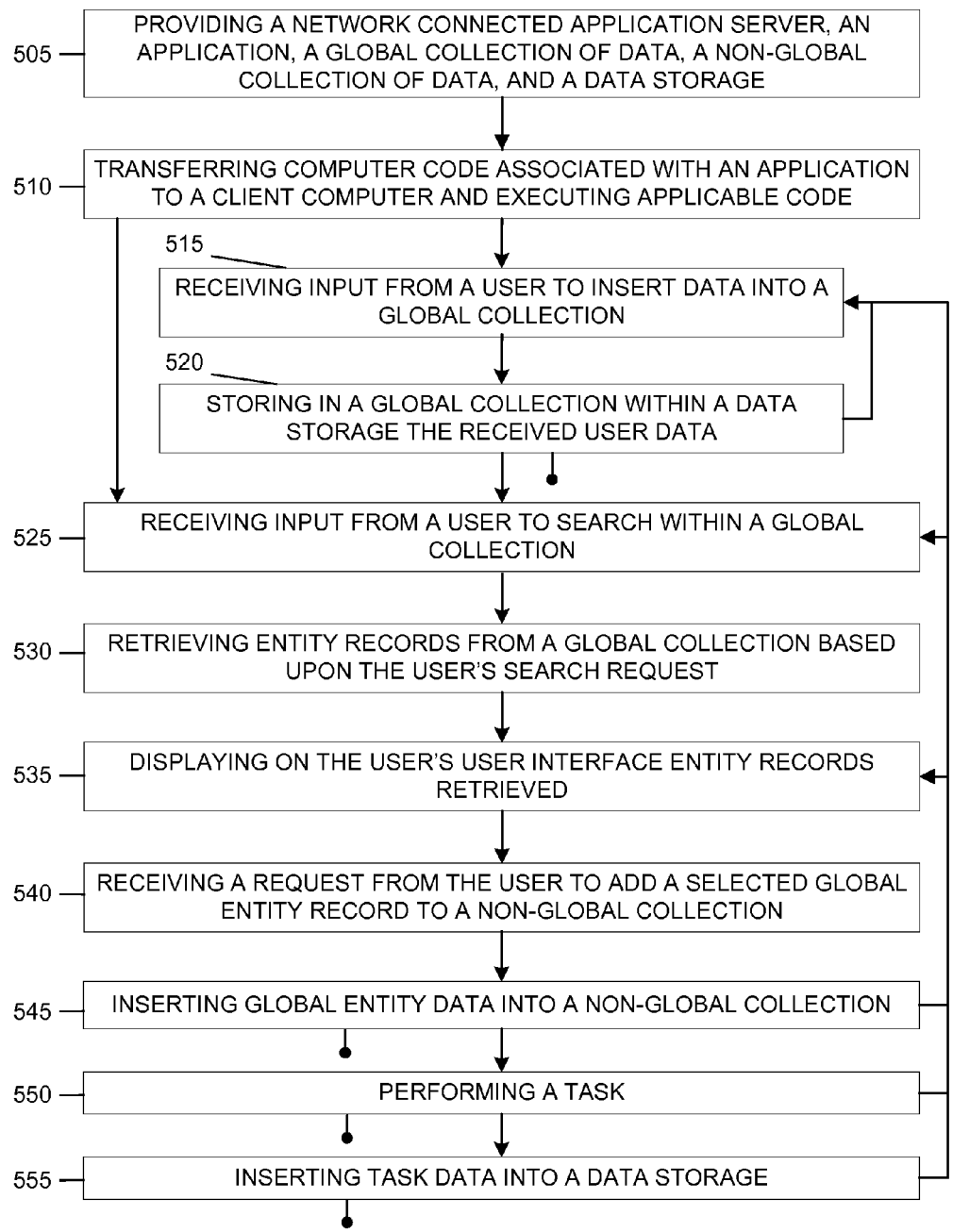
FIG. 5 is a flow diagram of an example of a method for associating global entities to personal or non-global data collections.

With reference to FIG. 5, an example of a method for associating global entities to personal or non-global data collections, method 500, will now be described.

As FIG. 5 shows, method 500 includes, at step 505, providing a network connected application server, an application, a global collection of data, a non-global collection of data, and a data storage. These elements were described in FIG. 4. However, the reader should note that the provision of the elements mentioned in step 505, such as, for example, a global collection of data and a data storage in which it resides, should not be deemed as requiring the implementor to own or operate the global collection and data storage. In some configurations, for example, it is possible for the implementor to subscribe to a global collection of data owned and operated by a company, such as a social media company, within the course of using method 500 with, for example, an application server leased to the implementor and an application created by or for the implementor.

Method 500 then, at step 510, includes transferring the computer code associated with an application to a client computer. The computer code may, for example, represent compiled code and/or non-compiled scripted code and/or browser-executable code, such as HTML and Javascript, configured to produce a display within a web browser on the client computer. The code may or may not work in coordination with code also executing on the application server. To the extent that code needs to be executed by the processor of the client computer rather than simply generating a user interface display, such is performed at this step.

After step 510, FIG. 5 serves to illustrate that in some variations, a user could add data to the global collection of entity records at steps 515 and 520, but in other variations, a user could proceed instead to step 530, where they would search for globally available entity records and thereafter add those entities to their local, non-global collection as explained herein. The described order of steps serves this particular configuration but alternative ordering is also possible.

At step 515, the user instructs the application, via the user interface, that they wish to add one or more entity records into a global collection. An example of this process may include a user who inputs data fields forming a record, portraying a business, into a collection of businesses available for search by other users of the same application or another application.

At step 520, the user input is stored within a data storage. The user input may consist of one global entity record or multiple global entity records. For example, a single global entity record portraying a customer may be inserted into a computer database. As mentioned elsewhere herein, the process of inserting to the data storage could occur in numerous ways, including but not limited to, data passing directly from the application to the data storage, data passing through the application server to the data storage, data passing over the internet, data passing across a local area network, etc.

After step 520, the application may follow the desires of the user, who may wish to add additional global entity records to a global collection in step 515, or who may wish to conclude use of the application or use other portions of the application not described by this application, or who may wish to then search for global entity records to add to a non-global collection. Such is represented by the different exemplary-flow arrows in the figure.

Continuing with method 500, in FIG. 5, step 525 illustrates that a user of an application may provide input or otherwise make a request representative of a search for records within a global collection. For example, a user may type "Amer" or "American" into a search textbox, in an effort to search for entities within a global collection of companies whose company name begins with "American", and click a "submit" button. In other variations, application user interfaces may not require text input and may retrieve records based upon a preset filter, such as assuming a search for all entities in a particular geographic area when the user performs a task, such as clicking a hyperlink or button. In fact, a search directive may direct the application to provide all records within a global collection and thus a search may not really indicate a search filter and may simply reflect a desire to retrieve all records from a global collection.

Furthermore, at step 525, if there are multiple global collections, the search may be configured to indicate which global collection should be searched. For example, if one global collection consisted of company entities and another global collection consisted of person entities, then a search may contain an identifier instructing an application which collection should be searched. The identifier may even reflect more than one global collection or all global collections. The identifier may be stored, for example, in a web browser's HTML code where the search button causes the browser to post the identifier back to an application server along with the user's desired search parameters.

At step 525, the application code may also modify the search query provided by a user in accordance with its desired business rules, the rules of the data storage to be searched, etc. For example, a user's search query could be reformatted or encrypted or adjusted to remove invalid characters before the planned forwarding of the search parameters in step 530.

Step 530 of FIG. 5, method 500, illustrates the process of the server using the user search request parameters from step 525 to retrieve data from the data storage. The various methods of configuring data storages and the network communications used between client-side application code, server-side application code, the application server, and the data storage itself have been addressed already herein. The search request itself may, for example, consist of a call to a database to retrieve records based upon search criteria. A call may commonly be made with Structured Query Language (SQL) to retrieve the desired records from a database such as Microsoft SQL Server or Oracle, but other methods of data retrieval may be employed.

At step 535, the application displays the retrieved entities to the user. The display may occur with HTML representation of the data in a web browser, or in other examples, the display of data may occur through user controls or textual output in non-HTML coding environments. The display of records may be in a standard data table or laid out per the graphical desires of the application designer. Since the records are intended to be selected by the user, the output may also include a selection option next to each record, such as the use of a radio button or checkbox per entity displayed.

At step 540 of method 500, the user provides input to the user interface to select the entity or entities they desire to be added to a non-global collection with which they have some association. For example, the user may check checkboxes of companies or persons displayed from the global collection, and click a submit button to express that they wish for those entities to be added to a non-global collection, such as a group of their customers or vendors. In the event that the user is associated with multiple non-global collections, the user may also indicate the non-global collection or collections to which the global entities should be copied. In other examples, a user could drag and drop an entity or entities from a global collection to a non-global collection.

At step 545, the data from the selected global entity or entities is inserted into one or more non-global collections. The non-global collection or collections have an association with the user. The association may be performed by mapping the entire collection to the user or by mapping each non-global entity record to the user, and each method is fundamentally comparable. Furthermore, the association of the user to the non-global collection may be performed in a direct mapping manner within the data schema or in an indirect mapping manner. An example of a direct mapping between a user and his non-global collection could involve a user ID being inserted as a data field into each entity record inserted into the non-global collection. An example of an indirect mapping between a user and his non-global collection could involve an employee of a company using a hosted application on behalf of their employer's organization, the user ID being associated with the organization and the organization then being associated with each entity record of the non-global collection. In this example of an indirect association, when a user selects records from a global collection which represents customers, for example, the customers added to the non-global collection are customers of the user's employer. Whether the association is direct or indirect should not be problematic for the individual employing the data structure and coding architecture. And, the reader should understand that references to associating data to a user, throughout this application, could also be deemed to include associating data to an organization with which the user has an association.

Also, with regard to the association of an entity to a non-global collection, there exists more than one way of doing so in common data architectures. For example, in a database, a table could exist for each collection, with the user ID and a collection ID being inserted with each row representing a collection, while another table could store the entity records with a data field containing the collection ID. Of course, other methods of architecting one or more non-global collections, each associated with a user or a user's organization, could be employed.

As also discussed in the description of the data storage in FIG. 3, there are multiple ways to insert the entity data into the non-global collection. For example, a plurality of data fields within each entity record could be copied verbatim from the global record to a new record created within the non-global collection, and if a data field "first_name" contained the value "John" in the global entity then a new data field value "John" would be created in the non-global record. Such copying of data is redundant to the data architecture, and thus consumes more bytes, but it provides the flexibility of allowing a user associated with a non-global collection to later modify the data without adverse effect on the global collection. For example, if a customer "John Smith" were copied from a social media database table to a new table within a user's "customer's" collection of non-global data, then the user could later edit the first name data field to "John Jr." without such a change being visible to other users of the social media global database collection. The user could also, for example, later delete the entire entity record from the non-global collection and the record would not be affected in the global collection. Or, the opposite is true in that the record could be modified or deleted within the global collection without affecting the existence of the same record, fundamentally, in the non-global collection.

Of course, as already discussed, it is also possible to utilize a data storage architecture whereby only an identifier of the global entity record is inserted as a member of a non-global collection, without redundantly copying many of the data fields. This would reduce total bytes, and leave the application presumably to not modify the data fields of the non-global collection or to modify the data fields of the global collection directly. In some examples, these effects of such an architecture could be advantageous, even though in other application implementations it could have an adverse effect.

In other examples, at step 545, it is possible that data could be modified during the insertion process. Data fields could be removed, data fields could be added, and/or data fields could be modified. The modification of data could exist in accordance with specific rules of the application, such as to remove all alphanumeric characters, or perhaps modification could be performed for encryption purposes.

In further examples, at step 545, it is possible that a user may have more than one non-global collection. For example, a user could maintain a non-global collection for customers and a different non-global collection for vendors.

As illustrated by the arrows following step 545, it is possible that a user could complete the use of the method but alternatively the user could use the existing display of global entities from step 535 and add another entity to their non-global collection without beginning with a new search. Or, of course, they could perform a new search for one or more additional entities from the global collection, or even choose to input one or more entities into the global collection, if the application is so configured. Or, the application could be configured to perform a task with the entity added to the non-global collection, as seen by the arrow proceeding to step 550. These lines serve to illustrate examples and not to be limiting to the choices shown.

At step 550, the application can be configured to perform a task. The task could be performed immediately thereafter the global entity was added to the non-global collection at step 545, or after additional user input, at the discretion of the application designer or implementor. For example, at step 545, the application could be configured to automatically email the added entity without further user input, where the entity is a prospect within a sales application. Or, in another example, at step 545, the application could be configured to display a choice of options to the user, upon which the user could select to generate an invoice to the added entity, where the entity is a customer within an accounting application, and activity related to invoicing could ensue at this step. Or, in another example, at step 545 the application could be configured to accept user input to perform a project management task with the added entity, where the entity is a fellow employee of the user within a project management application. Or, in another example, at step 545, the application could be configured to accept user input to open a support ticket for the added entity, where the entity is a customer of the user's employer, within a help desk application.

Much like after step 545, the application flow may continue after step 550 in one of many directions, as indicated by the arrow lines. These lines serve to illustrate examples and not to be limiting to the choices shown.

At step 555, the application can be configured to insert data into a data storage, where such data is associated with the task. For example, in an accounting application, the task performed at step 550, such as creating an invoice, could require saving of task-specific data, such as invoice details, to a data storage, such as a database, where the data saved is specific to the added entity.

Much like after steps 545 and 550, the application flow may continue after step 555 in one of many directions, as indicated by the arrow lines. These lines serve to illustrate examples and not to be limiting to the choices shown.

Giving consideration now to the overall method 500, it should be noted that step 515 could be performed by a different user than the user performing steps 525 through 555. In such cases, significant time may elapse between the input of a global entity per steps 515 and 520 and the retrieving of that same entity in step 530. It is also possible that different applications, even from different software publishers, could serve the input of data in step 515 from the search for the data in step 525.

The representation of method 500 may also serve to portray a bulk effort to associate entity records from a global collection to a non-global collection. For example, a user's search could consist of an uploaded file of customers, or uploaded list of email addresses, where customer names or email addresses are searched within a global collection at step 530, and in step 535 a bulk display of matching entities would be provided to the user and at step 540 the user could click a button to confirm that the matching entities should be added to a non-global collection.

The order of steps in FIG. 5 is consistent with typical configurations, but in other configurations, the order of steps may be altered. For example, step 550 could be performed before step 545.

Figure 6:
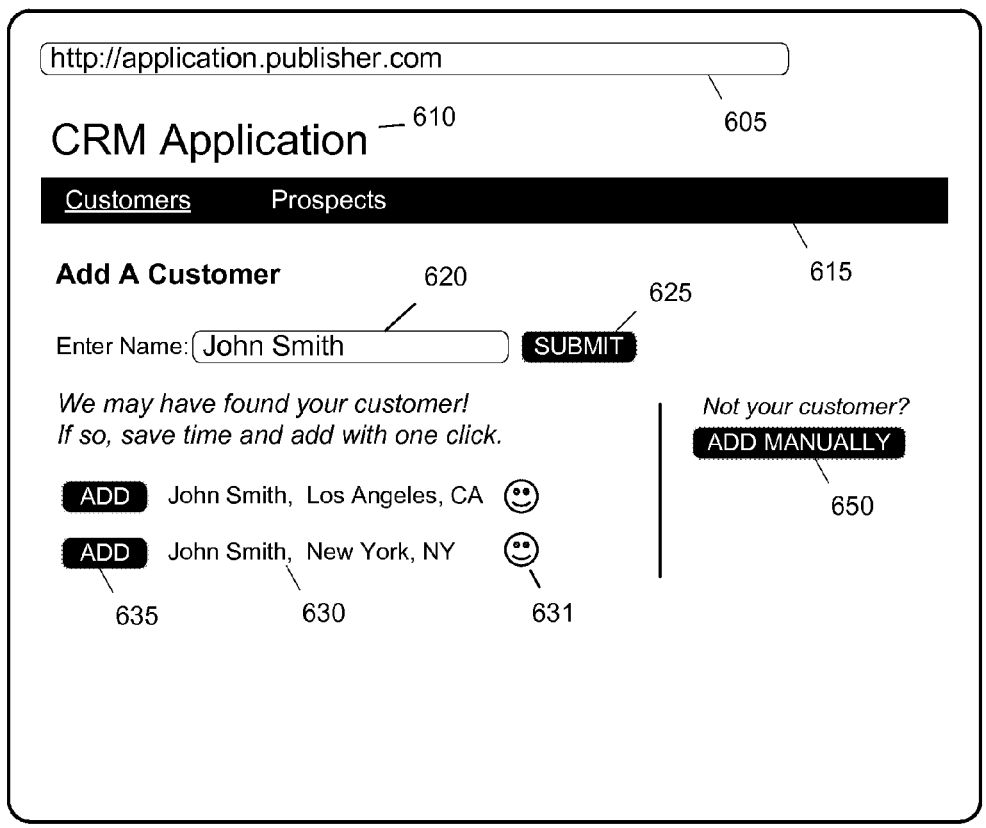
FIG. 6 is a screenshot of a first example of a user interface produced by an application according to the methods and systems described herein.

FIG. 6 illustrates an example application user interface, user interface 600, wherein the user interface is configured to allow a user to search entities from a global collection and add entities to a non-global collection. In this example, the non-global collection is assumed to be a collection of customers. User interface 600 represents a web page pointed to a website address 605. This example involves an application hosted on an application server at website address 605, working in conjunction with a web browser displaying this user interface 600. Other examples of a user interface include desktop applications, tablet applications, mobile phone applications, or even smart watch applications, all of which may not display a website address 605.

Example user interface 600 includes an example application name, application name 610. This application name, "CRM Application" reflects a customer relationship manager application. This example application is a hosted Software-as-a-Service (SaaS) application.

Example user interface 600 includes a navigation bar 615. Although not required, applications commonly have a navigation element, which in this case illustrates two options, customers and prospects, and the customers option has been selected, as indicated by the symbolic line underneath the word "Customers". We will further assume for purposes of this example that the user chose a sub-option "Add A Customer" from a flyout option on navigation bar 615. This selected page is designed to assist a user with the operation of adding a customer to their collection of customers. This collection would be considered to be a non-global collection for reasons including that it is not shared outside of this user's use of the application or outside of the organization which could employ the user in a business application scenario.

This example user interface 600 also includes an input textbox 620 and a submit button 625. Although a submit button 625 is not required, it is a commonly used element with input textboxes. Here, a user could type the name of an entity, in this case a customer, which they wish to add to their non-global collection, into input textbox 620 and either hit the "ENTER" key on their keyboard or click the "SUBMIT" button 625.

The example user interface 600 reflects the visual state as if the user has already entered a name, "John Smith," into input textbox 620, and clicked the submit button 625. Accordingly, the application in this example has already posted back to the application server, where additional application code has retrieved entities from a global collection at a data storage, where the entities match the user search parameters. The matching entity recordset is displayed on this example user interface 600. One example entity of the two shown is entity 630. Entity 630 is an example of an entity not yet contained in this user's non-global collection of customers, but it is being presented by the application as a choice of an entity from a global collection and the user is given the option to add this entity to their non-global collection.

Entity 630 contains multiple data fields, representing a person's first name, last name, city, state, and even an example image, entity image 631. Entity image 631 demonstrates that data fields could also contain binary data, or the path to a filename on a server, where the binary data or path represents an image of a person, such as a photo, or the image of a company logo in situations where the entity is a company. In this example, since the entity is a person, entity image 631 represents a photo of the person, entity 630.

Next to entity 630 is an example "ADD" button, add button 635. As reflected by text on the sample web page, this example user interface 600 allows a user to add a customer entity to a non-global collection with one click. If the user were to click the add button 635, the entity 630 would be added to their non-global collection without further confirmation or input required from the user. In alternative configurations, instead of using a button 635, an entity 630 could be dragged and dropped to an area of the user interface portraying a non-global collection.

At the time of data insertion to the non-global collection, the application may choose what data fields from the global entity will be copied to the non-global collection, as described herein. This example could represent a method where, if data were redundantly copied to the non-global collection, entity image 631 could be intentionally not stored within the non-global collection even though it was a data field in or associated with the global entity record. Or, the opposite could be true. Although the displayed data fields of entity 630 do not show a street address or postal code, those data fields could have been retrieved from the global entity record and been persisted by the application in stateful memory of the application server or client computer, or persisted in hidden HTML fields, or persisted via other means, and thus data not shown to the user can still be inserted into the non-global collection, even if not displayed on the user interface 600.

The non-global collection in this instance is a collection of the user's customers, which is known to the application because the user is on a page dedicated to adding customers. If the user were on a page intended to add another type of entity, such as prospects, then the selected global entity could be added to a non-global collection for prospects.

Example user interface 600 also illustrates that an alternative could exist by which a user could add a customer not found in the global collection of entities, the alternative being portrayed by the "ADD MANUALLY" button, button 650. This is not a required element of a user interface but serves to show that in some examples, an application may wish to allow a user to add an entity to a non-global collection by conventional means in addition to those described by this invention. If the user clicked this button 650, for example, they could be directed to a page of input controls, such as textboxes, where they could type a customer's first name, last name, street address, city, state and postal code, to be added to a non-global collection of their customers, and, to further the example, an application could be additionally configured to have a checkbox allowing the entity to be added to a global collection at the same time as being added to the non-global collection, or the application could add an entity to both collections without a checkbox.

FIG. 7 illustrates an example application user interface, user interface 700, where the user interface is configured to allow a user to add an entity to a global collection. User interface 700 represents a web page pointed to a website address 705. This example involves an application hosted on an application server at website address 705, working in conjunction with a web browser displaying this user interface 700. Other examples of a user interface include desktop applications, tablet applications, mobile phone applications, or even smart watch applications, all of which may not display a website address 705.

Example user interface 700 includes an area to display an application name, application name 710. This example application could be a hosted Software-as-a-Service (SaaS) application of varying types, or a social media application, or a data-entry application, etc.

Example user interface 700 includes a navigation bar 715. Although not required, applications commonly have a navigation element, which in this case illustrates a selected item, "Add Yourself," where the selection has been indicated by the symbolic line underneath the words. This selected page is designed to assist a user with the operation of adding themselves as an entity into a global collection of entities. This example collection would be considered to be a global collection for reasons including that this collection is shared with many users of this or other applications, most of those users, or possibly all of those users, being unknown to the user of this page.

In other variations, without the "Add Yourself" wording shown, example user interface 700 could easily be reconfigured to represent an interface for a user to add an entity other than himself, or other than the user's organization in a business environment. In such instances, the interface may appear similar to user interface 700, but, for example, a user "John," might type the details of an entity representing his organization's customer, and not details portraying himself or his organization, with the intention of creating a shared, global entity upon submission of the example form. Furthermore, if a user were adding an entity other than himself or his business organization, a possible variation might include the removal of checkbox 730 and the addition of a step to send a confirmation email, with an "approve" hyperlink, to the entity described in the form, to seek their approval to become a global entity; a Boolean or equivalent flag could be established in the global entity record to mark it as pending approval so it could be avoided in searches through that collection; if the user proceeded with approval, the user could be presented with a pictorial graphic, such as the one in FIG. 8, depicting a business card with their information data fields to be shared throughout the network of global entities in the global collection.

This example user interface 700 also includes two personal name input textboxes 720, and a company name input textbox 721. The company name input textbox 721 could be an optional input in some variations. Similarly, the personal name input textboxes 720 could be optional. The form could be configured to accept input of all types of entities, some of which could be persons, some of which could be companies without a person's name, some of which could be a human contact at a company, etc. The form could be configured to ask for the type of entity first and then display the applicable input elements for that entity type. Furthermore, another variation could include having two company name input textboxes, one to represent a legal company name and another to represent a shortened, common business name to be used in typical presentation of the entity to other users through one or more applications having access to the global collection. Further variations may also be deployed.

The example user interface 700 also includes an "attach your photo" button, button 723, and a "attach company logo" button, button 724. These, like all elements on the exemplar interface, illustrate possible options and not a required set of elements. Button 723 allows a user to upload a photo file of the user whose name is in name fields 720. Button 724 allows a user to upload a company logo image file. If the user interface were rendered with HTML, for example, these upload buttons could be within a form tag using the "enctype" property of "multipart-/form-data" and a submit method of "post" where an input tag specifies the type of "file", such as "<INPUT TYPE="FILE">". Other methodologies exist and could be employed. The images, upon receipt with the form data, could be stored, for example, as Blobs (Binary Large Objects) within the entity record as a data field, or as files on a server, or within a specialized database table intended only for files, etc. Images could thereafter be used in graphical depictions of a business card for the entity, such as the example shown in FIG. 8, or perhaps in any place through an application where an entity, either global or non-global, is portrayed.

Figure 8:
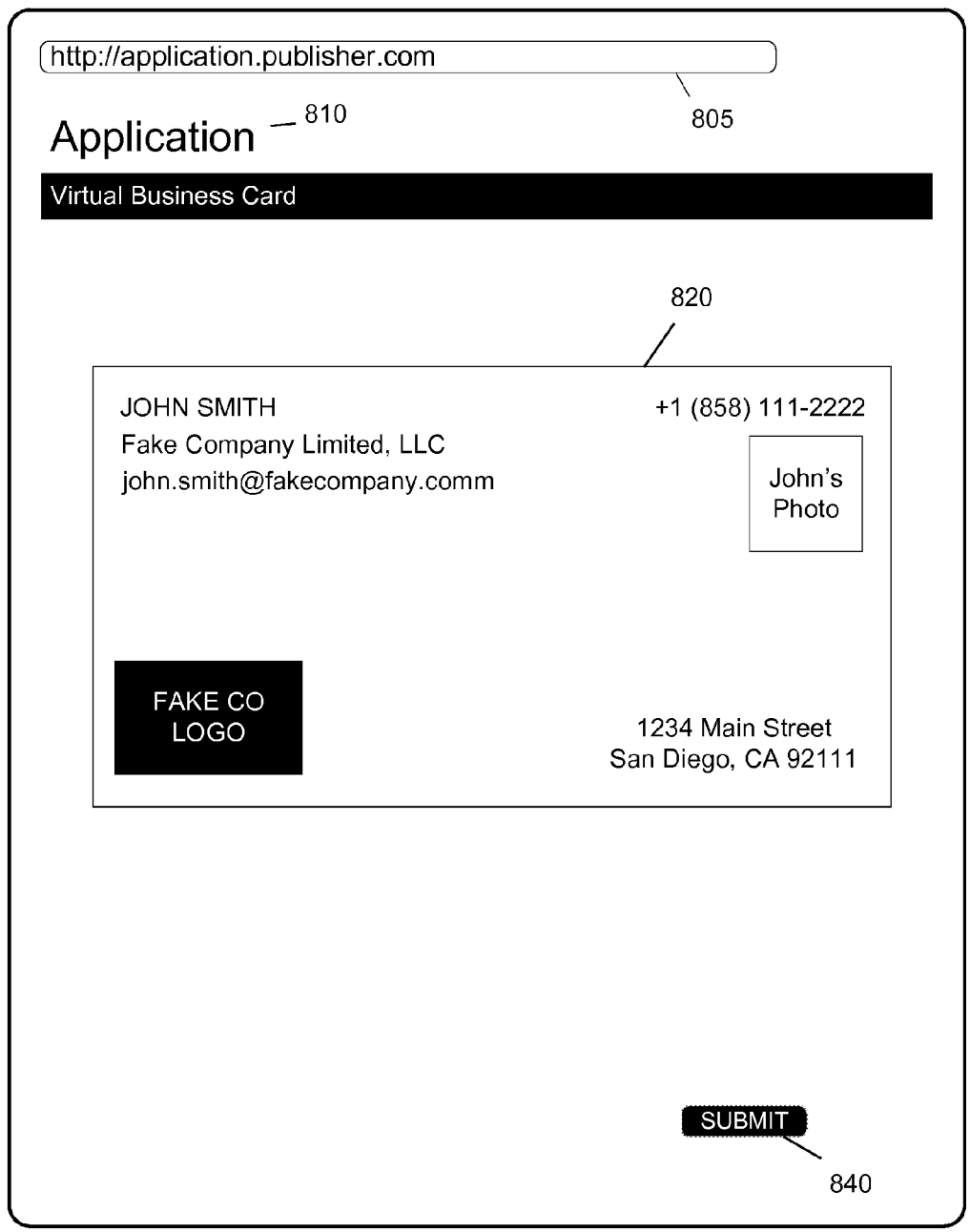
FIG. 8 is a screenshot of a third example of a user interface, containing a pictorial graphic depicting a business card with graphical elements, produced by an application according to the methods and systems described herein.

General input textboxes, such as textboxes 725, allow the user to add additional information to their entity record, the data fields of which, again, could be portrayed with a virtual business card pictorial as shown in FIG. 8. As with the other elements on this example user interface 700, these textboxes 725 are illustrative of one variation and not indicative of required fields. For example, a country input could be added, a phone number field could be deleted, or a job title field could be added dynamically if a company name were present. On a practical level, however, it would be prudent and likely a requirement of an application for either textboxes 720 or textbox 721 to be required, since having a name for an entity is a likely business requirement.

In addition to the data entered by the user through example user interface 700, the application, in other variations, could be configured to modify data prior to submission to the data storage or add supplemental data prior to submission to the data storage. For example, if the application could determine a postal code extension and modify a physical address so that "st." is converted to "Street," such could be performed per the discretion of the application designer or implementor.

Example user interface 700 includes a checkbox, confirmation checkbox 725. Although not required in such a user interface, this confirmation checkbox 725 serves to alert the user that their information will be added to the global collection, from which others out of the user's information space, or their organization's information space in the context of a business user, could then find them for purposes including adding them to non-global user collections. If this confirmation checkbox 730 were checked and the submit button 740 were clicked, the entity data fields reflected by the various text and file inputs on the user interface would then be inserted into a global collection of entities. As mentioned already, herein, this checkbox is optional, an assumption of true or false could be made by the application designer and/or implementor instead of using a user-configurable checkbox, and even other alternatives exist, such as the use of an email requiring the entity described to click a hyperlink to approve of their entity data fields being a part of a global entity record.

FIG. 8 illustrates an example application user interface, user interface 800, where the user interface is configured to display a pictorial graphic depicting a business card with graphical elements, graphic 820. User interface 800 represents a web page pointed to a website address 805. This example involves an application hosted on an application server at website address 805, working in conjunction with a web browser displaying this user interface 800. Other examples of a user interface include the interface of desktop applications, tablet applications, mobile phone applications, or even smart watch applications, all of which may not display a website address 805.

Example user interface 800 includes an area to display an application name, application name 810. This example application could be a hosted Software-as-a-Service (SaaS) application of varying types, or a social media application, or a mobile data-entry application, etc.

The pictorial graphic depicting a business card, graphic 820, could represent an image rendered by application code on the application server or the client computer. Graphic 820 could also be an HTML representation of data fields, wherein the individual elements are separate in construction and even appearance, but viewed together as a whole to form the virtual business card, graphic 820. The term "graphic" should be understood by the reader to loosely refer to the overall appearance of a graphical representation and not be interpreted, necessarily, as a single fixed image. HTML representations could, for example, even include actual textboxes with populated data instead of just fixed text on the user interface. If actual textboxes were used, those textboxes could be editable or locked as non-editable textboxes. Even in such a scenario involving editable textboxes, the reader should consider any overall area portraying a business card as a "graphic" regardless of the means of construction or the ability of the user to edit the data.

The data fields portrayed within graphic 820, including image fields, are associated with an entity. The entity could be a global entity or a non-global entity, although scenarios are more likely to utilize a virtual business card when a global entity is presented or represented to a user.

Example user interface 800 represents one of many scenarios for displaying a virtual business card, graphic 820. It could represent a scenario of a user looking at their own card, perhaps even with editable textboxes containing the data, where a submit button, such as button 840 serves to save changes; in such a configuration, the textboxes could be loaded with default data, the data having been read from the global entity data fields, the user could provide input to edit the data, and then the data on the screen would be saved back to the global entity data fields, thereby maintaining synchronization between the graphic 820 and the data fields in data storage. In another configuration, perhaps a graphic 820 would be used with editable textboxes to enter new data, where such data is not already present in an entity record. In another configuration, perhaps graphic 820 portrays a non-editable business card being presented to a user from another user on a network of global entities utilized by a SaaS application, where the other user whose entity data is shown is a new vendor of the user viewing the user interface; in such a configuration, data would be retrieved from the entity record upon loading of the user interface and the submit button, button 840, could serve as a confirmation that the data has been seen, so the application could proceed to another user interface screen. In another configuration, the graphic 820 could portray a possible vendor to the user viewing the user interface and the purpose of displaying the graphic 820 could be to allow the user to confirm a business relationship with the vendor, whereby seeing the data fields in a standardized visual format offers benefits to the user; in such as configuration, the submit button, button 840, could serve to perform a task such as adding a vendor record to a non-global vendors collections of entities. In another configuration, the graphic 820 could portray, to the user viewing the user interface, an entity found in the global collection, such as a customer, so the user could easily confirm the entity, perhaps even by image, and in such a configuration, the submit button, button 840 could serve to trigger the application to add the entity, in response to this one click, to a non-global collection of customers. There are many potential uses for virtual business cards as depicted by graphic 820, particularly in the context of managing entities within software applications.

Graphic 820 may also be configured to display either a subset of all entity data contained with the entity record, a superset of all entity data, or a one-for-one display of the data fields contained within the entity record. For example, it is possible to store data fields but not show them to some or all users on a virtual business card. It is also possible to show a superset of data, such as displaying a map image or statistical data which can be calculated from the entity data fields, and, of course, it is possible to show the exact data. Textual or graphical formatting, such as expanding a state abbreviation from "CA" to "California," can also be applied to the data fields, or added superset data to enhance appearance while still maintaining the underlying data when synchronizing with the data fields; such can be performed through methods including, but not limited to, HTML font adjustments, server-side coding or client-side JavaScript coding to modify displayed text snippets, CSS (Cascading Style Sheets), maintaining HTML value tags on input controls different than the data displayed, using hidden HTML form elements, etc.

It should also be appreciated that in some configurations, although not illustrated herein, a collection of virtual business card records within a data storage, where the business card information portrays global entities in concept, may be used fundamentally in the same, if not identical other than naming, manner to the application as a collection of global entities.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and nonobvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A method for utilizing global entities in software applications, comprising:
providing at least one data storage;
providing a global collection of data within a data storage, the collection comprising global entity records;
providing a non-global collection of data within a data storage, the collection comprising at least one non-global entity record;
providing at least one network connected application server, the application server being configured to access at least one data storage;
providing at least one application from a networked application server, the application being configured to be displayed with a user interface;
receiving user input of an application at a user interface, the user input including a search request for an entity within the global collection;
retrieving at least one entity record from the global collection, each entity record being specific to the user search request and each containing a unique identifier;
displaying, on the user interface, at least one of the retrieved records from the global collection;
receiving user input at the user interface, the user input to select at least one global entity from the displayed records from the global collection;
copying a plurality of data fields from each selected global entity to a non-global collection of data, wherein the non-global collection is associated with the user.

2. The method of claim 1 wherein the application is a hosted software application.

3. The method of claim 1 wherein the global collection comprises records within a social media database.

4. The method of claim 1 wherein the non-global collection comprises records within a database utilized by a hosted software application serving a plurality of subscribers.

5. The method of claim 1 wherein the non-global collection is associated with a company or a user associated with a company.

6. The method of claim 1 wherein the user interface is a web browser.

7. The method of claim 1 wherein entity records are records comprising at least one of the following group: customers; prospects; vendors; companies; contacts at companies; persons; employees; and combinations thereof.

8. The method of claim 1 wherein a data storage is located at a substantially different geographic location from the application server.

9. The method of claim 1 wherein the non-global collection is stored within a second data storage and an application server or an application is configured to access the first data storage and the second data storage.

10. The method of claim 1, further comprising receiving input from a different user of an application at a user interface, the user input comprising global entity data, and inserting said data into the global collection.

11. The method of claim 10, wherein the application is configured to permit entity data input by the user to comprise data describing an entity which is not either the user performing the input or that user's organization.

12. The method of claim 11, further comprising inserting, along with the global entity data, an identifier corresponding to the user who provided the input of data.

13. The method of claim 12, further comprising performing a task, the task being associated with the selected global entity.

14. The method of 13, further comprising inserting task data within a data storage, the data being related to the performing of the task.

15. A system for utilizing global entities in software applications comprising:
a computer network;
at least one network-connected server, the server being configured to:
at least partially execute computer code with a processor; and
transfer a software application to a client computer in network communication with said server, the client computer having a client display unit;
at least one data storage, a data storage being configured to store at least one collection of entity records;
a global collection of entity records, the global collection being a plurality of global entity records;
a non-global collection of entity records, the non-global collection being a plurality of non-global entity records;
a first software application including computer executable code configured to:
access a data storage containing a global collection of entity records; and
receive first user input at a client computer, the user input including data describing an entity; and
insert first user input as an entity into a global collection;
a second software application including computer executable code configured to:
access a data storage containing a global collection of entity records; and
access a data storage containing a non-global collection of entity records; and
display data associated with at least one entity record from the global collection on the client display unit; and
receive second user input to select at least one entity record from the displayed data; and
copy data associated with at least one selected global entity record to a non-global collection, the non-global collection being associated with the second user.

16. The system of claim 15 further comprising the second software application including computer executable code configured to:
receive second user input at a client computer, the input being a search request; and
read a search result set from a global collection, the search result set being at least one entity record matching the user search request.

17. The system of claim 16 wherein the entity input by the first user is the same entity as the entity selected by the second user.

18. The system of claim 16 wherein the first software application is configured to allow input of data associated with an entity other than the user or the user's organization.

19. The system of claim 16 wherein the second user input to select at least one entity record from the displayed data is the single action of clicking a display element appearing on the client display unit.

20. The system of claim 16 wherein the computer network comprises the Internet.

21. The system of claim 16 further comprising the first software application being configured to seek approval from the inserted entity before the inserted entity is deemed to be searchable by the second software application.

22. The system of claim 16 wherein the first software application and the second software application are published by different publishers.

23. The system of claim 15 wherein the first software application and the second software application are merely different instances of the same application.

24. A graphical entity utilization method, comprising:
providing a collection of data within a data storage, the collection comprising at least one entity record, the entity record including at least one data field;
providing a software application;
displaying, on a display unit of a computer configured to execute the software application, a pictorial graphic depicting a business card with graphical elements including at least a name field;
synchronizing the values of the graphical elements of the pictorial graphic depicting a business card with at least one data field within the corresponding entity record wherein the entity is configured within the data storage as a global entity.

25. A method for utilizing global entities in software applications, comprising:
providing at least one data storage;
providing a global collection of data within a data storage, the collection comprising global entity records;
providing a non-global collection of data within a data storage, the collection comprising at least one non-global entity record;
providing at least one network connected application server, the application server being configured to access at least one data storage;
providing at least one application from a networked application server, the application being configured to be displayed with a user interface;
receiving user input of an application at a user interface, the user input including a search request for an entity within the global collection;
retrieving at least one entity record from the global collection, each entity record being specific to the user search request and each containing a unique identifier;
displaying, on the user interface, at least one of the retrieved records from the global collection;
receiving user input at the user interface, the user input to select at least one global entity from the displayed records from the global collection;
copying a plurality of data fields from each selected global entity to a non-global collection of data, wherein the non-global collection is associated with the user; and
receiving input from a different user of an application at a user interface, the user input comprising global entity data, and inserting said data into the global collection,
wherein the application is configured to permit entity data input by the user to comprise data describing an entity which is not either the user performing the input or that user's organization.

26. A system for utilizing global entities in software applications comprising:
a computer network;
at least one network-connected server, the server being configured to:
at least partially execute computer code with a processor;
transfer a software application to a client computer in network communication with said server, the client computer having a client display unit;
at least one data storage, a data storage being configured to store at least one collection of entity records;
a global collection of entity records, the global collection being a plurality of global entity records;
a non-global collection of entity records, the non-global collection being a plurality of non-global entity records;
a first software application including computer executable code configured to:
access a data storage containing a global collection of entity records;
receive a first user input at a client computer, the first user input including data describing an entity; and
insert the first user input as an entity into a global collection;
a second software application including computer executable code configured to:
access a data storage containing a global collection of entity records;
access a data storage containing a non-global collection of entity records;
display data associated with at least one entity record from the global collection on the client display unit;
receive a second user input to select at least one entity record from the displayed data; and
copy data associated with at least one selected global entity record to a non-global collection, the non-global collection being associated with the second user,
wherein the copy data process of the second software application employs a data storage architecture permitting future editing of non-global entity data without causing change to the data in the global entity record.

27. A system for utilizing global entities in software applications comprising:
a computer network;
at least one network-connected server, the server being configured to:
at least partially execute computer code with a processor; and
transfer a software application to a client computer in network communication with said server, the client computer having a client display unit;
at least one data storage, a data storage being configured to store at least one collection of entity records;
a global collection of entity records, the global collection being a plurality of global entity records;
a non-global collection of entity records, the non-global collection being a plurality of non-global entity records;
a first software application including computer executable code configured to:
access a data storage containing a global collection of entity records; and
receive first user input at a client computer, the user input including data describing an entity; and
insert first user input as an entity into a global collection;
a second software application including computer executable code configured to:
access a data storage containing a global collection of entity records; and
access a data storage containing a non-global collection of entity records; and
display data associated with at least one entity record from the global collection on the client display unit; and
receive second user input to select at least one entity record from the displayed data; and copy data associated with at least one selected global entity record to a non-global collection, the non-global collection being associated with the second user, wherein the first software application is configured to permit entity data input by the user to comprise data describing an entity which is not either the user performing the input or that user's organization, and wherein the copy data process of the second software application employs a data storage architecture permitting future editing of non-global entity data without causing change to the data in the global entity record.

28. The system of claim 27 wherein the first software application and the second software application are merely different instances of the same application.

29. The method of claim 27 wherein the non-global collection comprises records within a database utilized by a hosted software application serving a plurality of subscribers.

* * * * *